(12) United States Patent
Khijniak et al.

(10) Patent No.: US 7,969,933 B2
(45) Date of Patent: Jun. 28, 2011

(54) SYSTEM AND METHOD FOR FACILITATING A PERSISTENT APPLICATION SESSION WITH ANONYMITY BETWEEN A MOBILE HOST AND A NETWORK HOST

(75) Inventors: Dmitri Khijniak, San Diego, CA (US); John Thomas Moring, Encinitas, CA (US); Khaled I. Dessouky, Studio City, CA (US); Justin Paul McNew, Del Mar, CA (US)

(73) Assignee: Kapsch Trafficcom AG, Vienna (AT)

( * ) Notice: Subject to any disclaimer, the term of this patent is extended or adjusted under 35 U.S.C. 154(b) by 686 days.

(21) Appl. No.: 12/046,227

(22) Filed: Mar. 11, 2008

(65) Prior Publication Data

US 2009/0034495 A1 Feb. 5, 2009

Related U.S. Application Data (60) Provisional application No. 60/953,954, filed on Aug. 3, 2007.

(51) Int. Cl.
*H04W 4/00* (2009.01)
*H04L 12/28* (2006.01)
*G06F 12/00* (2006.01)
*G06F 11/30* (2006.01)

(52) U.S. Cl. ......... 370/328; 370/338; 370/389; 726/21; 713/189

(58) Field of Classification Search .................. None
See application file for complete search history.

(56) References Cited

U.S. PATENT DOCUMENTS

| 7,693,056 | B2* | 4/2010 | Heissenbuttel et al. | 370/230 |
| 2005/0050356 | A1* | 3/2005 | King et al. | 713/201 |
| 2008/0195865 | A1* | 8/2008 | Nikander | 713/170 |
| 2008/0271132 | A1* | 10/2008 | Jokela et al. | 726/10 |

* cited by examiner

*Primary Examiner* — Nittaya Juntima
(74) *Attorney, Agent, or Firm* — Christie, Parker & Hale, LLP (57) ABSTRACT

System and method for facilitating a persistent application session with anonymity between a mobile host and a network host in a wireless communication environment. The system and method include establishing a first communication session between the mobile host and the network host through a first radio access point; receiving a first mobile host identifier and a mobile host address from the mobile host during the first communication session, wherein the first mobile host identifier is different from the mobile host address; terminating the first communication session due to movement of the mobile host; establishing a second communication session between the mobile host and the network host using the first mobile host identifier, through a second radio access point; and receiving a second mobile host identifier from the mobile host during the second communication session, wherein the second mobile host identifier is different from the first mobile host identifier and the mobile host address.

20 Claims, 5 Drawing Sheets

SYSTEM AND METHOD FOR FACILITATING A PERSISTENT APPLICATION SESSION WITH ANONYMITY BETWEEN A MOBILE HOST AND A NETWORK HOST

CROSS-REFERENCE TO RELATED APPLICATION(S)

This Patent Application claims the benefit of the filing date of U.S. Provisional Patent Application Ser. No. 60/953,954, filed on Aug. 3, 2007 and entitled "Persistent Sessions with Anonymity in a Dynamic Communications Environment," the entire content of which is hereby expressly incorporated by reference.

FIELD OF THE INVENTION

The present invention relates generally to wireless communications, and more particularly to a system and method for facilitating a persistent application session between a mobile host and a network host in a wireless communication environment.

BACKGROUND

Figure 1:
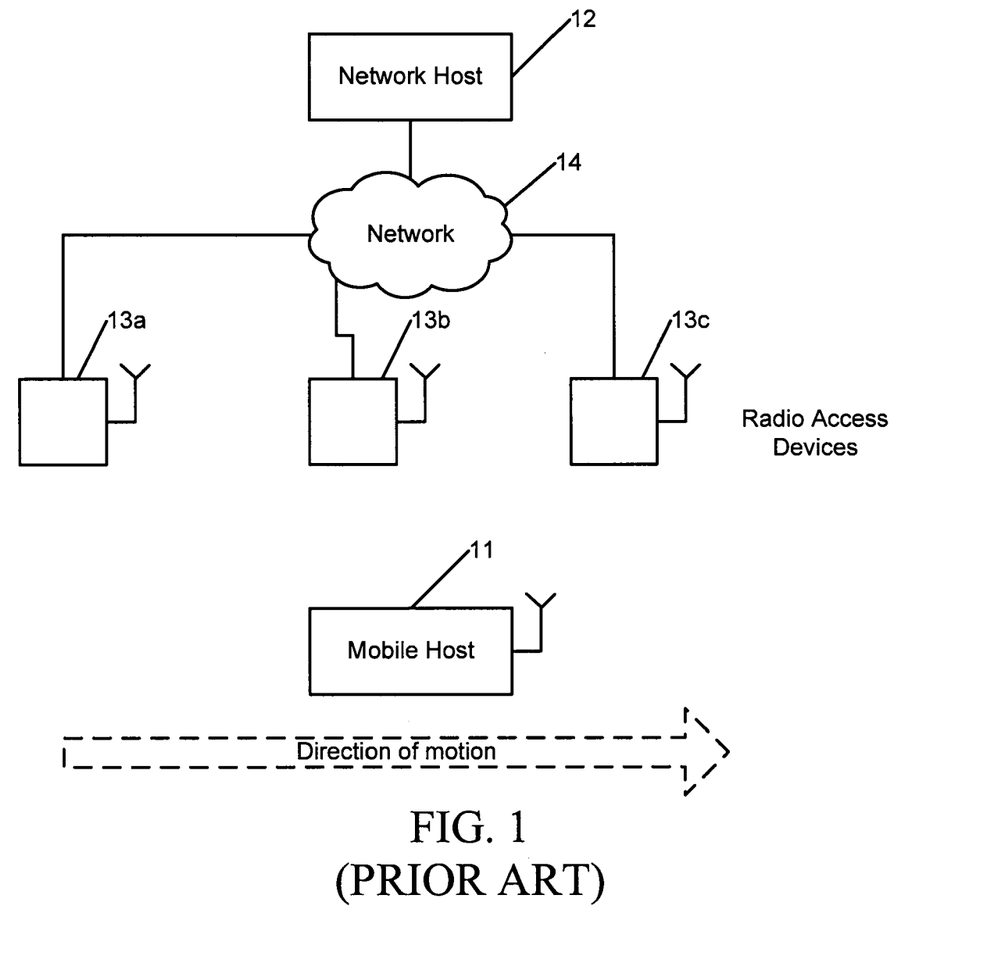
FIG. 1 shows an example system block diagram with the location of mobile and network applications.

Applications running within a vehicle or mobile host access applications running on network hosts attached to the wireline network. This is accomplished via a wireless link from a mobile host 11 through multiple roadside radio access devices 13a-13c, and associated network links from the radio access devices through a network 14 to a network host 12. Mobile host 11 may connect through multiple radio access devices 13a-13c in sequence, over the course of a single application session, but experiencing interruptions in connectivity while in between wireless coverage areas, as shown in FIG. 1. A roadside radio access device, also known as an access point or access unit, typically provides an entrance point for radio-equipped devices within its coverage area, to a more general data communications network. It may be mounted along a roadside, or in any location within radio range of the serviced mobile units. Although, FIG. 1 illustrates a simplified one-to-one relationship between mobile host and network host, in practice, the relationship may be many-to-many.

A mobile environment offers unique challenges for different applications. For example, with relatively short range communications (for example, 1000 m), the mobile host's communication zone is limited and its communication opportunities can be short lived.

Additionally, for mobile applications, the time duration of the connection is critical. Thus, the sooner the mobile application can reestablish its session after it reaches another area of coverage, the longer the application has to exchange useful data. Having a mobile application retain some communication state information across subsequent communications connections can maximize the opportunity to communicate, since the devices do not have to recreate context information during each connection.

Moreover, a mobile host network address changes; for example, an Internet Protocol (IP) address changes depending on the network connection point of the mobile host. Mobile host identity is important in maintaining a communication session with the network. Simultaneously, mobile host identity can help the network application to track the mobile host between successive communication connections.

Finally, mobile host communications typically have security requirements such as authentication, authorization and confidentiality. Additionally, it is often desirable to disguise the identity of the mobile host, so that a third-party listener can not draw conclusions about its communications traffic or physical movement by monitoring its activities over time. This latter requirement is known as anonymity.

Figure 2:
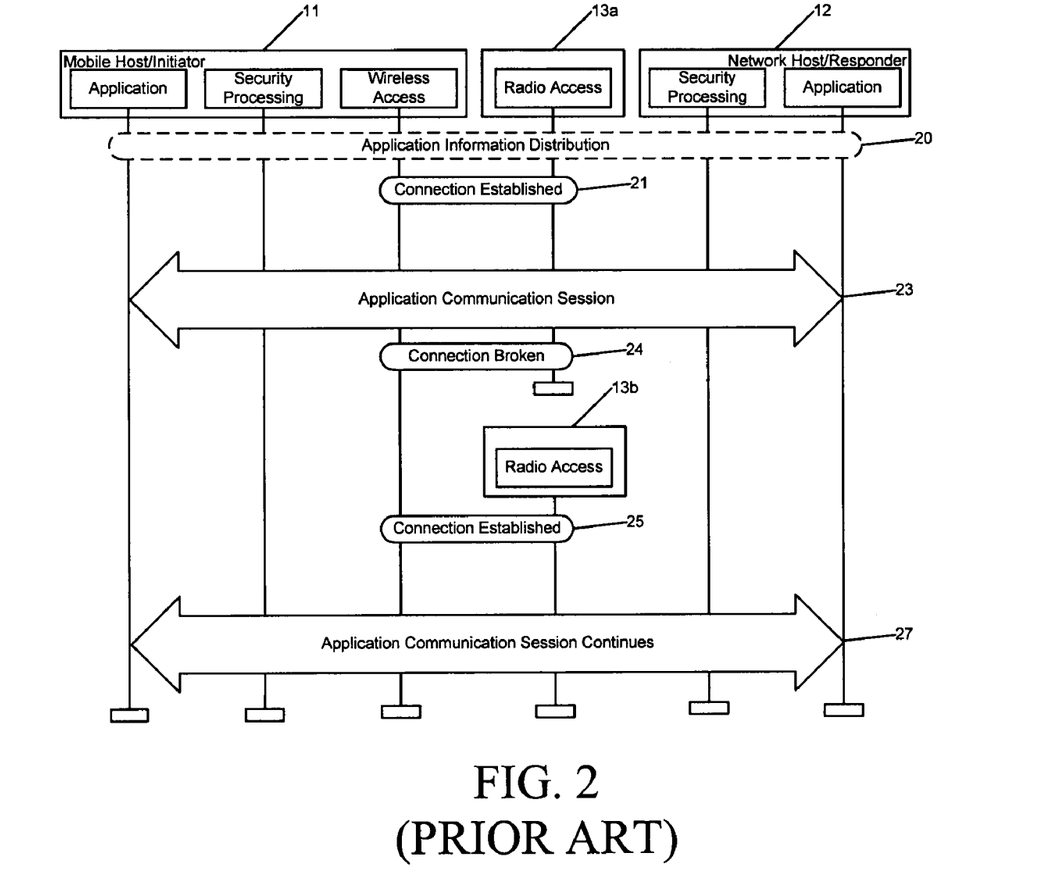
FIG. 2 shows a typical sequence of discontinuous communication.

A typical multi-connection communications session is shown in FIG. 2. The mobile host 11 establishes a connection 21 to the network via a radio access point 13a, and performs a communications session 23, based on a priori knowledge of the application or on an application information distribution 20, until the connection is broken 24. Later a connection is reestablished 25 through a different access point 13b, and the communications session may continue 27, after its state has been recovered through some application-specific message exchange.

Internet Protocol networking allows mobility via dynamic re-addressing of the mobile host. However, when the mobile host 11 reconnects 25 and is assigned a new address, it needs to restart its session with the network host 12 under its new identity. The network provides no continuity between the first and second connections. Any continuity is provided at the application level, for example, via a user login. This consumes extra time and network overhead.

A Host Identity Protocol (HIP) specifies protocols to exchange cryptographic key material between communicating hosts using open/public unsecure networks. The key material can be subsequently used to establish a secure encrypted session. HIP is designed to work in the mobile environment while providing IP based connectivity to applications. HIP is optimized to facilitate key exchange when communication time is of the essence. It is also designed to reduce impact of frequent disconnects on the applications. HIP is considered a "layer 3.5" protocol, residing between the traditional layers 3 (network) and 4 (transport). HIP utilizes a Host Identity Tag (HIT) that remains unchanged while mobile host IP address can change from one communications session to the next. Instead of a conventional IP address, HIP-based applications use a fixed HIT to identify the communicating host in establishing a communication session. Encapsulated Security Payload (ESP) adds support for privacy. Likewise, the Security Architecture for IP provides a generic privacy capability. Additionally, mobility and multi-homing extensions allow hosts to report a change to their network IP address.

However, these protocols do not address anonymity. Since the same host identifier, i.e., HIT, is used in the second connection as was used in the first connection, a third party could monitor the network exchanges and track the movements of the mobile host.

U.S. Pat. No. 6,574,455, entitled "Method and apparatus for ensuring security of users of Bluetooth enabled devices," describes a method for changing device-specific information on iterative connections. In this case, a master device broadcasts a network descriptor that changes over time. As a result, any device not continuously tracking the changes is not able to associate the transmissions of the master device with its transmissions from a previous time. This approach, however, only disguises the network, not the individual devices. Moreover, U.S. Pat. No. 7,194,760, entitled "Method for protecting privacy when using a Bluetooth device" discloses a method that causes a device to employ false addresses to prevent listeners from deducing its identity. It does not, however, provide a persistent identifier that can be used to associate a device with a false address with the same device when using a different address.

Therefore, there is a need for a method and system that provides persistent sessions with anonymity, in a dynamic wireless communications environment.

SUMMARY

A system and method for facilitating a persistent application session between a mobile host and a network host in a wireless communication environment. The system and method include establishing a first communication session between the mobile host and the network host through a first radio access point; receiving a first mobile host identifier and a mobile host address from the mobile host during the first communication session, wherein the first mobile host identifier is different from the mobile host address; terminating the first communication session due to movement of the mobile host; establishing a second communication session between the mobile host and the network host using the first mobile host identifier, through a second radio access point; and receiving a second mobile host identifier from the mobile host during the second communication session, wherein the second mobile host identifier is different from the first mobile host identifier and the mobile host address.

Either one of the first mobile host identifier and the second mobile host identifier may be encrypted using different known encryption methods.

A Host Identity Protocol may be employed in the mobile host. Also, either one of the first mobile host identifier and the second mobile host identifier may be authenticated using a Wireless Access in Vehicular Environments (WAVE) certificate.

DETAILED DESCRIPTION

In some embodiments, the present invention is a system and method for facilitating a persistent application session with anonymity between a mobile host and a network host in a wireless communication environment. It achieves anonymity by use of a host identifier, which is distinct from any address associated with the device, allowing the protocols that process the addresses to operate without modification.

The present invention allows a mobile host to prevent a third party from tracking communication patterns of the mobile host over a series of connections. This is accomplished by a returning mobile host identifying itself to the network host using a host identifier that it has sent to the network host in a private message during a previous connection.

A mobile host wishing to participate in a prolonged application session with a network host risks communications interruptions during the course of the session. During the first connection, the mobile host announces to the network host a host ID, encrypted for privacy. After interruption of the communication connectivity, the mobile host, now potentially with a new network address, identifies itself to the network host via the host ID. A third party monitoring the exchanges can not track the mobile host by its communications, because all identifying information either changes with a new connection (as for the network address) or is sent encrypted (as for the host ID).

The invention includes a security protocol process, distributed between processing engines at the mobile and network sides. It could be implemented in a communication device, such as that shown in FIG. 3.

Figure 3:
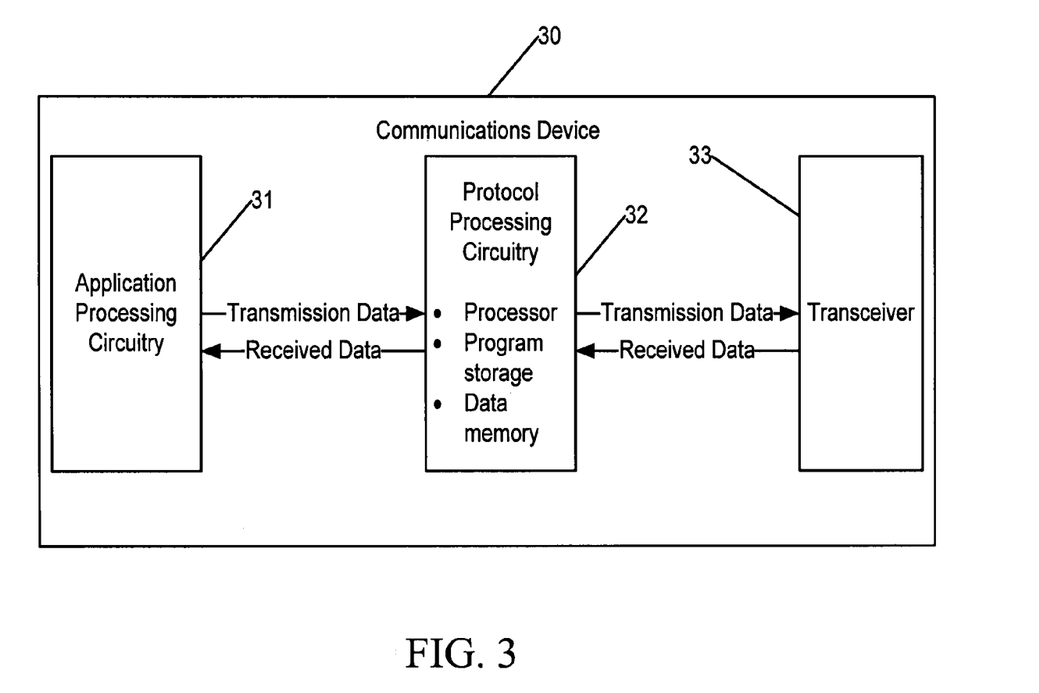
FIG. 3 depicts an exemplary block diagram, according to some embodiments of the present invention.

FIG. 3 depicts an exemplary block diagram, according to some embodiments of the present invention. A communication device 30 uses a minimum of additional processing cycles and memory and includes a radio transceiver 33, a protocol processing circuitry 32, and an application processing circuitry 31. In some embodiments, the methods of the invention are implemented in the protocol processing circuitry 32, which typically includes both program and data memory. The methods may be implemented by the same physical processor as the one which executes the applications, or a physically separate one.

Figure 4:
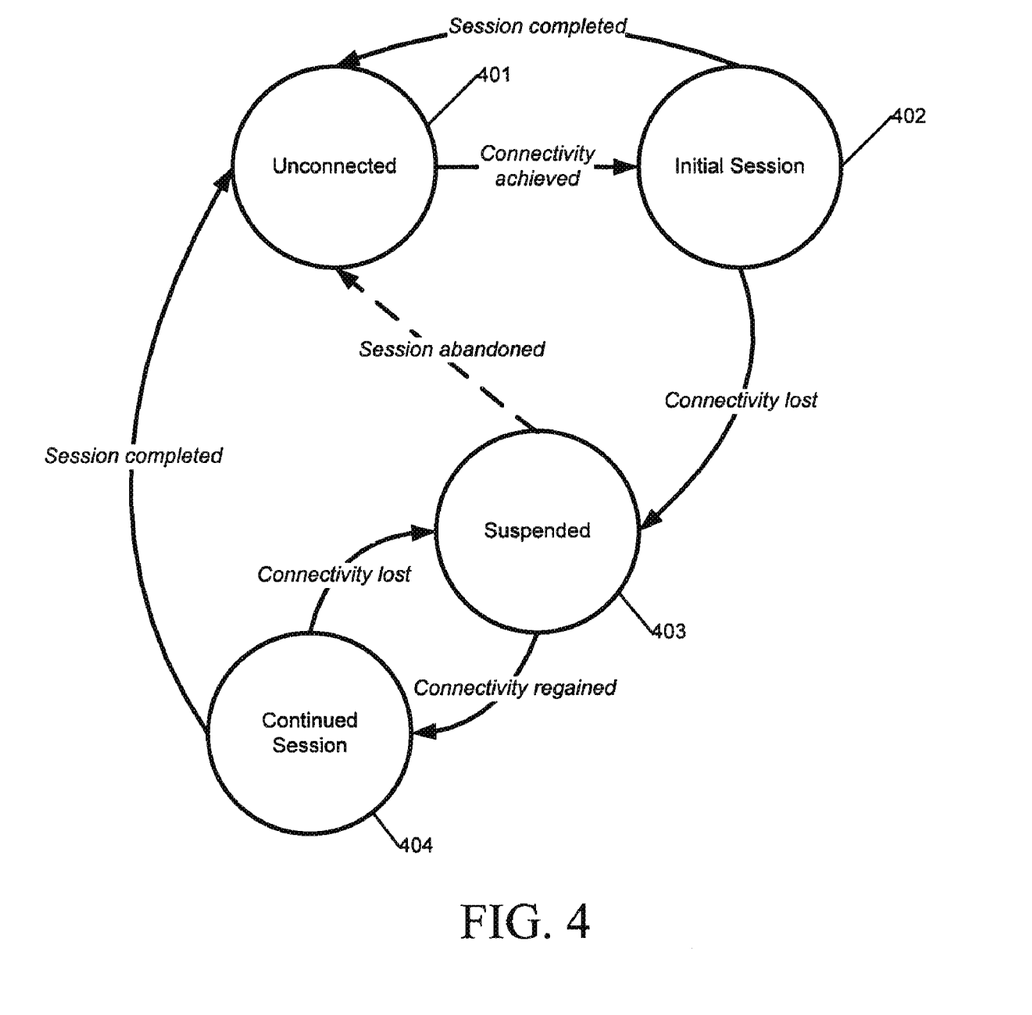
FIG. 4 shows an exemplary state transition diagram, according to some embodiments of the present invention.

FIG. 4 illustrates an exemplary state transition diagram, according to some embodiments of the present invention. From an unconnected state 401, devices enter an initial session 402 between the mobile host and the network host, during which time the mobile host provides a mobile host ID announcement to be used in the future. After a loss of communications connectivity, the session enters a suspended state 403. When regaining the communications connection, where the mobile host may have a new network address, the session continues 404 with the mobile host providing a mobile host ID confirmation functionally equivalent to the previous mobile host ID announcement. In order to maintain anonymity, the mobile host ID is encrypted, either at its announcement during the initial session, or when it is confirmed during the continued session, or both.

In the nominal case, when the application completes, the session is terminated with a return to the unconnected state 401. Additionally, at any point, (though not explicitly shown in FIG. 4 for the sake of clarity) the session may be terminated with a return to the unconnected state 401, for example, if the application times out, etc. This is further illustrated in the flow diagram of FIG. 5.

Figure 5:
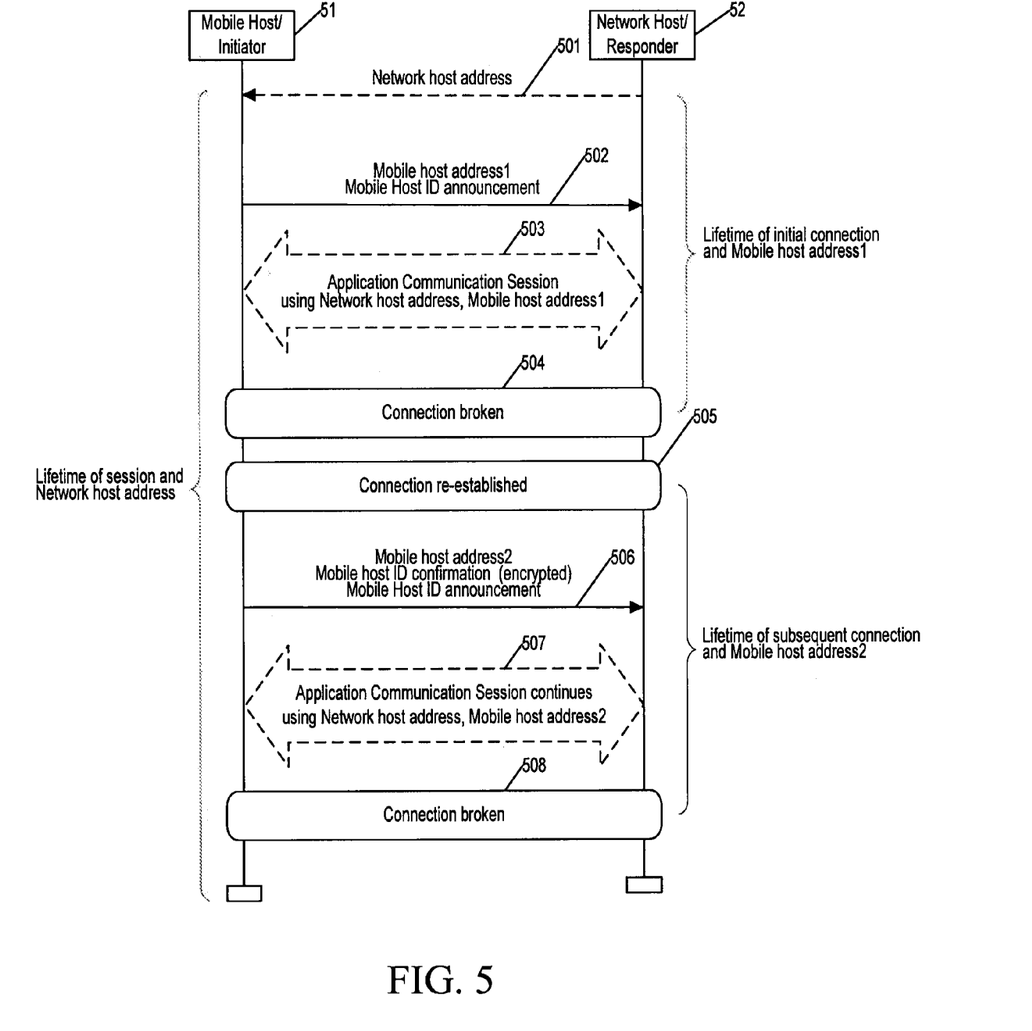
FIG. 5 shows a simplified flow diagram, according to some embodiments of the present invention.

FIG. 5 shows a simplified flow diagram, according to some embodiments of the present invention. As a precursor to the sequence, a mobile host 51 acquires the network address (501) of a network host 52, and possibly other information such as application services offered and a public cryptographic key. This information could be preconfigured in the mobile host, acquired from some network database, dynamically determined through an announcement process such as that of a Wireless Access in Vehicular Environments (WAVE) system, or derived through other means. The mobile host also acquires a mobile host address, for example a dynamic IPv4 address, via a Dynamic Host Configuration Protocol (DHCP) or a global IPv6 address via autoconfiguration.

The mobile host 51 contacts the network host 52, providing its mobile host address (502), and performing whatever exchanges are appropriate to initiate the particular application session of interest to the hosts. Since the connection is potentially transitory and could be abruptly terminated due to moving of the mobile host and/or loss of radio connectivity for various reasons (for example, blockage, network host's radio access point congestion or failure, and the like), the mobile host, early in the exchange, provides to the network host a mobile host ID announcement (502). This mobile host ID announcement is used to identify the mobile host during subsequent connections, when it may have a different network address. The mobile host ID could take any number of forms, for example, one convenient form is the Host Identifier defined in a Host Identity Protocol. The mobile host ID announcement may be encrypted, using a public key provided by the network host or a symmetric key provided by either host, as discussed below. An application session 503 is then established, using the network host address and mobile host address 1.

At some point the mobile host loses connectivity (504), and becomes unreachable from the network host, and the mobile host address loses its validity. With no connectivity between the hosts, the application session goes into a suspended state.

When the mobile host re-establishes connection (505) with the network, it typically acquires a new mobile host address compatible with its current network connection point (for example, via IPv6 autoconfiguration). The mobile host notifies the network host that it is connected (506), identifies itself with a mobile host ID confirmation containing the information functionally equivalent to that in the previously-supplied mobile host ID announcement, and supplies its new mobile host address. The application session may then resume (507) from the point at which it was interrupted, using the new mobile host address 2.

A listening party is prevented from associating the mobile host ID confirmation with the previous mobile host ID announcement. To accomplish this, either the mobile host ID confirmation or the mobile host ID announcement (or both) is encrypted. The encryption may employ a public key (not shown) provided by the network host, a symmetric key (not shown) provided by either host, or any other cryptographic method. If the mobile host ID announcement is encrypted, then the mobile host ID confirmation need not be encrypted.

At this time, the mobile host also provides a new mobile host ID announcement (506), for use on a subsequent connection. Each subsequent connection following the initial connection uses a similar process of confirming the previously-announced host ID, allowing the session to continue, and announcing a new host ID for use in the next connection.

For simplicity, the operation has been described as if each host supports a single application. In practice, each host may support multiple applications, with multiple individual application sub-sessions occurring within the duration of the overall "session" described above.

The invention is capable of working in combination with existing networking techniques. It is compatible with Internet Protocol operations, both IPv4 and IPv6. In one embodiment, the invention may be combined with the proposed Host Identity Protocol (HIP), to extend the capabilities of that protocol to include mobile host anonymity. An example of how this could be accomplished follows.

In embodiments where the invention is combined with HIP, the host ID of this invention would take the form of the Host Identifier specified in HIP. The mobile host would perform the role of the HIP Initiator and the network host would perform the role of the HIP Responder. HIP includes two separate message exchanges: a four-message initial exchange (I1-R1-I2-R2), and a three-message update exchange (Update1-Update2-Update3). In one embodiment, this invention's host ID announcement would be included in the I2 message (or alternately I1). It would be encrypted to ensure anonymity, possibly with a symmetric cryptographic key also included in the I2 message. This session key could optionally be used to encrypt application session transmissions during the initial connection.

In one such embodiment, the invention's host ID confirmation could be accomplished by generating a Host Identity Tag (HIT) from the announced host ID (by the hash function specified by HIP), and including the calculated HIT in the Initiator's HIT field of the Update1 and Update3 messages sent by the mobile host. From this, the network host can associate the host sending the updates to the host previously involved in the initial exchange. In this embodiment, the mobiles host's Update1 message (or Update3 message) also includes a host ID announcement, for use in the subsequent connection. As when the host ID announcement is sent in the I2 message, it is encrypted to ensure anonymity. A new symmetric cryptographic key may be used for the encryption, and also included in the update message. Use of a different session key than in the previous connection prevents a third party from associating the two transmissions of the host ID, and associating the same mobile host with the two connections.

While it will be advantageous in some cases to combine the invention with HIP, HIP is not necessary to achieve the primary benefits of the invention, and other host ID representations and message exchanges equally represent the invention.

In one embodiment, the invention is combined with HIP as described above, and additionally a certificate based authentication is employed. Rather than the Diffie-Hellman key exchange described in the base HIP, this embodiment would use certificates such as those described in a WAVE system. This is desirable for a system where the certificates are mandated, as well as other systems that might benefit from the security and efficiency characteristics of such certificates.

In some embodiments, the invention is a method, system, and/or device for facilitating a persistent application session between a mobile host and a network host, wherein the mobile host provides to the network host a mobile host identifier, and then the mobile host uses the mobile host identifier to identify itself when the mobile host later re-connects to the network host, where the mobile host identifier is different than the network address associated with the mobile host. The mobile host identifier may include a public cryptographic key. Moreover, the mobile host network address may be an IPv4 address or an IPv6 address. At least one of the original mobile host identifier and the later mobile host identifier may be encrypted.

Among the systems (and environments) that would benefit from employing the system and method of the present invention are the WAVE system and certain systems implementing the Host Identity Protocol and related protocols.

Certain wireless communications systems, such as the WAVE system are comprised of mobile vehicular units and roadside radio access units allowing connectivity into a network infrastructure. The units of this particular system exchange both high priority/low latency data (for example, emergency warnings), and low priority/best effort data (for example, map updates). They employ a series of radio channels in the 5 GHz band, although operation in other frequency bands is also possible.

In one embodiment, the mobile host additionally employs the Host Identity Protocol and the encryption may be performed using a public cryptographic key of the network host or a symmetric cryptographic key shared between the mobile host and the network host. The certificates used to authenticate at least one of the mobile host and the network host may be WAVE certificates.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention, as defined by the appended claims.

What is claimed is:

1. A method for facilitating a persistent application session with anonymity between a mobile host and a network host in a wireless communication environment, the method comprising:
   establishing a first communication connection between the mobile host and the network host through a first radio access point;
   receiving a first mobile host identifier and a mobile host address from the mobile host during the first communication connection, wherein the first mobile host identifier is different from the mobile host address;
   terminating the first communication connection due to movement of the mobile host;
   establishing a second communication connection between the mobile host and the network host using the first mobile host identifier, through a second radio access point; and
   receiving a second mobile host identifier from the mobile host during the second communication connection for use in a subsequent communication session between the mobile host and the network host, wherein the second mobile host identifier is different from the first mobile host identifier and the mobile host address.

2. The method of claim 1, wherein the first and second mobile host identifiers include a public cryptographic key.

3. The method of claim 1, wherein the mobile host address is one of an IPv4 address, and an IPv6 address.

4. The method of claim 1, further comprising encrypting at least one of the first mobile host identifier and the second mobile host identifier.

5. The method of claim 1, further comprising employing a Host Identity Protocol in the mobile host.

6. The method of claim 5, further comprising encrypting at least one of the first mobile host identifier and the second mobile host identifier using a public cryptographic key of the network host.

7. The method of claim 5, further comprising encrypting at least one of the first mobile host identifier and the second mobile host identifier using a symmetric cryptographic key shared between the mobile host and the network host.

8. The method of claim 5, further comprising authenticating at least one of the first mobile host identifier and the second mobile host identifier using a Wireless Access in Vehicular Environments (WAVE) certificate.

9. A communication device for facilitating a persistent application session with a network host in a wireless communication environment comprising:
   a processing unit and
   a memory, wherein the memory having stored thereon a set of instructions, when executed by the processing unit, cause the communication device to perform the steps of:
      establishing a first communication connection with the network host through a first radio access point;
      transmitting a first mobile host identifier and a mobile host address to the network host during the first communication connection, wherein the first mobile host identifier is different from the mobile host address;
      terminating the first communication connection due to movement of the communication device;
      establishing a second communication connection with the network host using the first mobile host identifier, through a second radio access point; and
      transmitting a second mobile host identifier to the network host during the second communication connection for use in a subsequent communication session between the mobile host and the network host, wherein the second mobile host identifier is different from the first mobile host identifier and the mobile host address.

10. The communication device of claim 9, wherein the first and second mobile host identifiers include a public cryptographic key.

11. The communication device of claim 9, wherein the mobile host address is one of an IPv4 address, and an IPv6 address.

12. The communication device of claim 9, further comprising instructions, when executed by the processing unit, causing the communication device to perform the step of encrypting at least one of the first mobile host identifier and the second mobile host identifier.

13. The communication device of claim 9, wherein the communication device employs a Host Identity Protocol.

14. A system for facilitating a persistent application session with anonymity between a mobile host and a network host in a wireless communication environment comprising:
   means for establishing a first communication connection between the mobile host and the network host through a first radio access point;
   means for receiving a first mobile host identifier and a mobile host address from the mobile host during the first communication connection, wherein the first mobile host identifier is different from the mobile host address;
   means for terminating the first communication connection due to movement of the mobile host;
   means for establishing a second communication connection between the mobile host and the network host using the first mobile host identifier, through a second radio access point; and
   means for receiving a second mobile host identifier from the mobile host during the second communication connection for use in a subsequent communication session between the mobile host and the network host, wherein the second mobile host identifier is different from the first mobile host identifier and the mobile host address.

15. The system of claim 14, wherein the first and second mobile host identifiers include a public cryptographic key.

16. The system of claim 14, wherein the mobile host address is one of an IPv4 address, and an IPv6 address.

17. The system of claim 14, further comprising means for encrypting at least one of the first mobile host identifier and the second mobile host identifier.

18. The system of claim 14, wherein the mobile host employs a Host Identity Protocol.

19. The system of claim 18, further comprising means for encrypting at least one of the first mobile host identifier and the second mobile host identifier using a public cryptographic key of the network host, or a symmetric cryptographic key shared between the mobile host and the network host.

20. The system of claim 18, further comprising means for authenticating at least one of the first mobile host identifier and the second mobile host identifier using a Wireless Access in Vehicular Environments (WAVE) certificate.

* * * * *

UNITED STATES PATENT AND TRADEMARK OFFICE
CERTIFICATE OF CORRECTION

PATENT NO. : 7,969,933 B2 Page 1 of 1
APPLICATION NO. : 12/046227
DATED : June 28, 2011
INVENTOR(S) : Dmitri Khijniak et al.

It is certified that error appears in the above-identified patent and that said Letters Patent is hereby corrected as shown below:

Column 7, line 25, Claim 1    Delete "session",
                              Insert --connection--

Column 8, line 6, Claim 9     Delete "session",
                              Insert --connection--

Column 8, line 42, Claim 14   Delete "session",
                              Insert --connection--

Signed and Sealed this
Twenty-second Day of November, 2011

David J. Kappos
*Director of the United States Patent and Trademark Office*